Patented Apr. 28, 1936

2,038,709

UNITED STATES PATENT OFFICE 2,038,709

STABILIZED ACID LATEX AND METHOD OF MAKING THE SAME

Howard J. Billings, Acton, Mass., assignor to Arthur D. Little, Inc., Cambridge, Mass., a corporation of Massachusetts No Drawing. Application April 5, 1935, Serial No. 14,921

10 Claims. (Cl. 18—50)

My invention relates to a stabilized latex, and more particularly it relates to an uncoagulated acid latex which is stabilized with a compound imparting new and desirable properties thereto.

One object of my invention is to provide a latex which, due to the incorporation therewith of a stabilizing agent, can be acidified to any desired degree without coagulation of the dispersed rubber particles.

A further object of the invention is to provide an uncoagulated acid latex which is of wide applicability in the industries and from which the various rubber products may be easily manufactured.

Other objects, including the novel process of preparing the latex of the invention, will be apparent from a consideration of the specification and claims.

Heretofore, in the preparation of acid latex difficulty has been encountered due to the fact that saponin, the most commonly used stabilizer, causes the latex to foam. The foaming presents a problem in the manufacture of products from the latex, since the minute bubbles formed are difficult to remove. Furthermore, saponin is biologically active, causing haemolysis, and, therefore, an industrial hazard is encountered in the manufacture of the latex compositions and rubber products.

The present invention provides an acid latex in which the tendency to foam is reduced and in the use of which the manufacturing difficulties due to bubbles in the latex are minimized. The stabilizing agent is also haemolytically inactive, and, therefore, no hazard is encountered in the manufacture of the acid latex, or of the rubber goods, or by the user of the products.

The present invention contemplates the preparation of an uncoagulated acid latex whose pH index may vary between 7 and 1, or even lower, as desired, and in which the tendency of the latex to coagulate has been obviated by the inclusion of a water-soluble glycyrrhizin salt therewith before acidulation. The soluble glycyrrhizin salt may be a substance which per se is water-soluble such as as a suitable glycyrrhizate salt, or it may be a compound which, although technically water-insoluble, becomes soluble in the latex, for example, glycyrrhizic acid which reacts with the ammonia of ammonia-stabilized latex to form soluble ammonium glycyrrhizate. Any water-soluble salt of glycyrrhizic acid may be employed and the sodium, potassium, ammonium, and magnesium salts have proved to be particularly applicable. Since glycyrrhizic acid contains three carboxyl groups, the mono-, di-, or tri-salts may be used, and the mixed salts containing more than one cation are also available, e. g., monomagnesium, di-ammonium glycyrrhizate. Mixtures of the various salts may be employed, if desired.

The latex to which the soluble glycyrrhizin salt is added may be of any type, either neutral or alkaline, and excellent results are obtained by using the stabilized product containing any suitable material such as ammonia, particularly the ammonia-stabilized product containing 38% to 40% rubber solids.

The soluble glycyrrhizin salt is added to the latex before the acid is added and the mixture is thoroughly agitated. Preferably, in order to distribute the glycyrrhizin salt through the latex, it is dissolved, if water-soluble, in a small amount of water before addition. Thereafter, the acid is added, preferably during the agitation of the latex, in amounts to give an acid latex of the desired hydrogen ion concentration. Obviously, the amount added to give the desired acidity will depend on the alkalinity of the latex, if ammonia-stabilized latex, for example, is treated. As previously stated, a stable acid latex of any desired pH index below 7 may be easily obtained without danger of coagulation of the dispersed rubber particles. The acids added may be organic or inorganic, for example, acetic, formic, hydrochloric, phosphoric, sulphuric, and nitric acids. The concentration of the acid may be varied over a wide range, although the use of fairly dilute acids is preferred. In the case of the strong mineral acids, the concentration should be below the point at which deleterious side reactions occur, for example, oxidation of the rubber particles and the like. A satisfactory concentration of acid has been found to be about three times normal strength. If desired, the latex may be rendered acid after the addition of the glycyrrhizin salt by a relatively weak acid such as acetic, and thereafter brought to the desired pH index by the addition of a mineral acid.

The amount of soluble glycyrrhizin salt may vary widely, but in general it should be present in amounts greater than 2% of the rubber solids in the latex, a satisfactory result being obtained when 2.3% to 3.0% of a glycyrrhizate is utilized. Since the molecular weight of the glycyrrhizin radical is high, as compared to that of the cation or cations employed, and since the percentages are not critical above a minimum, the percentage figures are applicable for the various glycyrrhizin salts. No deleterious effects are obtained if the amount of glycyrrhizin salt added is high and the only disadvantage resides in the waste of the material.

In a typical example 1.14 grams of ammonium glycyrrhizate dissolved in 5 c. c. of water is added to 100 grams of ammoniacal latex containing 38% rubber solids. After thorough mixing, 20% acetic acid is slowly added in an amount to give the desired acidity. Throughout the addition of the acid, the latex is well agitated.

The latex of the invention may be employed in accordance with the usual practices in the manufacture of many types of rubber products, including dipped, coated, calendered, and impregnated products. It is also applicable for use in rubber cements and similar adhesives. If desired, accelerating agents, sulphur, fillers, pigments, and the like can be incorporated with the latex in accordance with the standard practice.

Considerable modification is possible in the choice of the glycyrrhizin compound employed, as well as in the percentage thereof used without departing from the essential features of the invention.

I claim:

1. Latex stabilized with a water-soluble glycyrrhizin salt, capable of being acidified without coagulation.

2. Ammonia-containing latex stabilized with a water-soluble glycyrrhizin salt, capable of being acidified without coagulation.

3. An uncoagulated acid latex stabilized with a water-soluble glycyrrhizin salt.

4. An uncoagulated acid latex stabilized with a water-soluble glycyrrhizin salt, present in an amount in excess of 2% of the weight of the rubber solids in the latex.

5. An uncoagulated acid latex stabilized with a soluble glycyrrhizin salt selected from the following group:—sodium, potassium, ammonium, magnesium glycyrrhizinate, present in an amount in excess of 2% of the weight of the rubber solids in the latex.

6. The process of making an uncoagulated acid latex which comprises adding to latex a water-soluble glycyrrhizin salt, and thereafter adding acid thereto.

7. The process of making an uncoagulated acid latex which comprises adding to ammonia-stabilized latex a water-soluble glycyrrhizin salt, and thereafter adding acid thereto.

8. The process of making an uncoagulated acid latex which comprises adding to latex a water-soluble glycyrrhizin salt in an amount in excess of 2% of the weight of the rubber solids in the latex, and thereafter adding acid thereto.

9. The step in the process of making an uncoagulated acid latex which comprises adding to latex a water-soluble glycyrrhizin salt.

10. The step in the process of making an uncoagulated acid latex which comprises adding to ammonia-stabilized latex a water-soluble glycyrrhizin salt.

HOWARD J. BILLINGS.